United States Patent
Hecht

(10) Patent No.: US 9,468,979 B2
(45) Date of Patent: Oct. 18, 2016

(54) ROTARY CUTTING TOOL INCLUDING CUTTING HEAD HAVING COUPLING PIN WITH GUIDING AND FASTENING RECESSES

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 363 days.

(21) Appl. No.: 14/307,287

(22) Filed: Jun. 17, 2014

(65) Prior Publication Data

US 2015/0360300 A1 Dec. 17, 2015

(51) Int. Cl.
*B23B 51/00* (2006.01)
*B23B 31/107* (2006.01)
*B23B 31/113* (2006.01)
*B23B 51/02* (2006.01)

(52) U.S. Cl.
CPC ........... *B23B 51/00* (2013.01); *B23B 31/1074* (2013.01); *B23B 31/1076* (2013.01); *B23B 31/113* (2013.01); *B23B 51/02* (2013.01); *B23B 2205/04* (2013.01); *B23B 2251/02* (2013.01); *B23B 2260/136* (2013.01); *Y10T 408/9098* (2015.01); *Y10T 408/90993* (2015.01)

(58) Field of Classification Search
CPC ..... B23B 51/00; B23B 51/02; B23B 31/113; B23B 2251/02; Y10T 408/9098; Y10T 408/90993
See application file for complete search history.

(56) References Cited

U.S. PATENT DOCUMENTS

| | | |
|---|---|---|
| 2,039,855 A | 5/1936 | Stone |
| 3,747,946 A | 7/1973 | Edens |
| 5,957,631 A | 9/1999 | Hecht |
| 6,012,881 A | 1/2000 | Scheer |
| 6,379,089 B1 | 4/2002 | Sugiura et al. |
| 8,021,088 B2 * | 9/2011 | Hecht .................... B23B 51/02 408/1 R |
| 8,449,227 B2 * | 5/2013 | Danielsson ............. B23B 51/02 408/226 |

(Continued)

FOREIGN PATENT DOCUMENTS

| | | |
|---|---|---|
| JP | S53 139683 U | 11/1978 |
| JP | H11 197923 | 7/1999 |

OTHER PUBLICATIONS

Search report dated Nov. 11, 2015 issued in counterpart PCT application (No. PCT/IL2015/050545).

*Primary Examiner* — Eric A Gates
(74) *Attorney, Agent, or Firm* — Womble Carlyle

(57) ABSTRACT

A cutting head has driven surfaces and includes a head coupling pin that protrudes rearwardly from a head rear surface. The head coupling pin includes guiding and fastening recesses recessed in the pin peripheral surface, the guiding recess opening out to the pin rear surface. A tool holder assembly has a tool holder and an elastic fastening assembly. The tool holder has driving members and a holder coupling hole recessed in a holder base surface. The elastic fastening assembly is disposed in a holder through bore that extends from the holder base surface to a holder peripheral surface. When a cutting tool which includes the cutting head and tool holder is in a fastened position, the head coupling pin is removably retained within the holder coupling hole upon elastic engagement with the elastic fastening assembly.

24 Claims, 7 Drawing Sheets

(56) References Cited

U.S. PATENT DOCUMENTS

| | | | | |
|---|---|---|---|---|
| 8,678,722 B2* | 3/2014 | Aare | ............ | B23B 51/02 408/226 |
| 8,721,235 B2* | 5/2014 | Kretzschmann | ........ | B23B 51/02 408/144 |
| 8,882,413 B2* | 11/2014 | Hecht | ............ | B23B 51/02 408/226 |
| 8,992,141 B2* | 3/2015 | Hecht | ............ | B23B 51/02 408/230 |
| 9,028,180 B2* | 5/2015 | Hecht | ............ | B23B 51/02 408/230 |
| 9,162,295 B2* | 10/2015 | Pabel | ............ | B23B 51/02 |
| 2005/0098359 A1 | 5/2005 | Lee | | |
| 2009/0116920 A1 | 5/2009 | Bae | | |
| 2011/0110739 A1 | 5/2011 | Frisendahl | | |
| 2014/0301799 A1* | 10/2014 | Schwaegerl | ............ | B23B 51/02 408/231 |

* cited by examiner

ROTARY CUTTING TOOL INCLUDING CUTTING HEAD HAVING COUPLING PIN WITH GUIDING AND FASTENING RECESSES

FIELD OF THE INVENTION

The subject matter of the present application relates to rotary cutting tools of the type in which a cutting head is releasably retained in a tool holder by means of a coupling mechanism.

BACKGROUND OF THE INVENTION

Rotary cutting tools can be provided with a coupling mechanism for securely retaining a cutting head within a tool holder. The cutting head can include a male coupling member and the tool holder can include a female coupling member. US 2009/0116920 discloses a rotary cutting tool having a cutting head attached to a drill body in press fit manner. Alternatively, at least one fastening member can be used to releasably secure the male coupling member within the female coupling member.

In some such rotary cutting tools, there is one or more fastening member in the form of a clamping screw. Examples of such rotary cutting tools are disclosed in, for example, U.S. Pat. No. 6,012,881 and US 2005/0098359.

In other such rotary cutting tools the fastening members are resilient locking pins. An example of such a rotary cutting tool is disclosed in, for example, U.S. Pat. No. 5,957,631.

US 2011/110739 discloses a rotatable tool having a loose top that is attached to a basic body where a snap-in member provisionally clamps the loose top to the basic body and reliable fixation of the loose top is carried out exclusively by a locking screw.

SUMMARY OF THE INVENTION

In accordance with a first aspect of the subject matter of the present application there is provided a rotary cutting tool comprising:
a cutting head having a head central axis defining a forward to rearward direction and about which the cutting head is rotatable in a rotational direction, the cutting head comprising a forward end forming a cutting portion and a rearward end forming a head coupling portion;
 the cutting portion comprising:
 a head rear surface, defining a boundary between the cutting portion and the head coupling portion;
 a head rear abutment surface, located on the head rear surface;
 two cutting arms extending radially with respect to the head central axis, each comprising a driven surface; and
 the head coupling portion comprising a head coupling pin, protruding rearwardly from the head rear surface along the head central axis, the head coupling pin comprising:
 a pin rear surface spaced apart from the head rear surface and a pin peripheral surface extending therebetween;
 a guiding recess, recessed in the pin peripheral surface, opening out to the pin rear surface, and comprising a guiding surface extending in a forward axial direction from the pin rear surface towards the cutting portion; and
 a fastening recess, recessed in the pin peripheral surface, and comprising a lower inclined surface which is radially outwardly sloped relative to the head central axis, in the rearward direction of the cutting head; wherein
 at least a portion of the lower inclined surface axially overlaps an overlapping region of the guiding surface, said portion comprising a fastening surface that is angularly closer to said overlapping region in the direction opposite the rotational direction than in the rotational direction; and
a tool holder, having a holder longitudinal axis, extending in the forward to rearward direction and about which the tool holder is rotatable in the rotational direction, the tool holder comprising:
 a holder peripheral surface extending circumferentially along the holder longitudinal axis and forming a boundary of a holder base surface at a forward end of the tool holder;
 two circumferentially spaced apart driving members extending forwardly from the holder base surface;
 a holder coupling hole recessed in the holder base surface and extending along the holder longitudinal axis in the rearward direction; and
 a holder through bore extending along a holder through bore axis from the holder coupling hole to the holder peripheral surface; and
 an elastic fastening assembly releasably engaged to the tool holder at the holder through bore, and having a protruding portion protruding into the holder coupling hole; wherein
the rotary cutting tool is adjustable between a guided position and a fastened position, and in the guided position;
 the head coupling pin is located in the holder coupling hole; and
 the protruding portion is located in the guiding recess; and in the fastened position:
 the cutting head is releasably attached to the tool holder by the elastic fastening assembly;
 the head coupling pin is located in the holder coupling hole;
 each cutting arm is in contact with a respective driving member; and
 the elastic fastening assembly elastically engages the fastening surface.

It is understood that the above-said is a summary, and that features described hereinafter may be applicable in any combination to the subject matter of the present application, for example, any of the following features may be applicable to the cutting head, the tool holder or the rotary cutting tool:

The fastening surface can be radially inwardly sloped relative to the head central axis, in the rotational direction of the cutting head.

A fastening axial half-plane that extends from the head central axis intersects the fastening surface. The fastening axial half-plane can intersect one of the driven surfaces.

The fastening surface can be located in a portion of the lower inclined surface that is closest to the overlapping region of the guiding surface in a direction opposite the rotational direction.

The guiding surface can be planar and parallel to the head central axis.

The overlapping region of the guiding surface can intersect the fastening surface.

The fastening surface can be planar.

The head coupling pin can comprise exactly one guiding recess and exactly one fastening recess.

The tool holder can comprise a holder base abutment surface, located on the holder base surface. In the fastened position of the rotary cutting tool, the head rear abutment surface can abut the holder base abutment surface.

In a cross-sectional view taken in a first tool plane perpendicular to the head central axis and through the fastening surface, the holder through bore can form an acute first angle with the fastening surface, the acute first angle being measured in a direction opposite the rotational direction. In a cross-sectional view taken in a second tool plane containing the head central axis and the holder through bore axis, the holder through bore can form an acute external second angle with the fastening surface.

The cutting head can be angularly displaced, relative to the tool holder, by no more than 90° upon adjustment between the guided position and the fastened position of the rotary cutting tool.

The rotary cutting tool can be further adjustable between the fastened position and a locked position, and in the locked position, the cutting head can be releasably attached to the tool holder by the elastic fastening assembly. The head coupling pin can be located in the holder coupling hole. Each cutting arm can be in contact with a respective driving member. The elastic fastening assembly can clampingly engage the fastening surface.

The head coupling pin can comprise exactly one guiding recess and exactly one fastening recess. The tool holder can comprise exactly one holder through bore and exactly one elastic fastening assembly releasably engaged to the tool holder.

The elastic fastening assembly can extend along an elastic fastening assembly axis that is co-axial with the holder through bore axis. The elastic fastening assembly can comprise a fixation member, a rigid member and an elastic biasing member located axially therebetween along the elastic fastening assembly axis. The protruding portion can be located on the rigid member. The fixation member can be releasably engaged at the holder through bore.

The rigid member can comprise an end surface that is perpendicular to the elastic fastening assembly axis and a side surface that extends circumferentially along the elastic fastening assembly axis and that circumferentially bounds the end surface. The end surface and the side surface can intersect to form a beveled surface. In the fastened position, a portion of the beveled surface can abut the fastening surface.

The elastic fastening assembly can extend along an elastic fastening assembly axis that is co-axial with the holder through bore axis. The elastic fastening assembly can comprise a fixation member, a rigid member and an elastic biasing member located axially therebetween along the elastic fastening assembly axis. The protruding portion can be located on the rigid member. The fixation member can be releasably engaged at the holder through bore. The elastic biasing member can be a biasing spring. The fixation member can further comprise a locking portion extending towards the rigid member through the biasing spring. The fixation member can displaceable along the through bore axis. In the locked position of the rotary cutting tool, the locking portion can abut the rigid member.

In the fastened position, the elastic fastening assembly elastically engages the fastening surface at a contact region that can be rotationally behind the holder through bore axis.

The head coupling pin can be non-fluted.

The holder through bore axis can lie in a holder plane perpendicular to the holder longitudinal axis.

The holder through bore axis can intersect the holder longitudinal axis.

Each arm rotationally trailing surface can comprise an arm latch that protrudes therefrom and extends in a direction from the head central axis to the arm peripheral surface. Each driving member can comprise driving member rotationally leading and trailing surfaces and a driving member peripheral surface extending peripherally therebetween. Each driving member rotationally leading surface can comprise a driving member undercut that is recessed therefrom and extends in a direction from the holder longitudinal axis to the driving member peripheral surface. Each arm latch can be located in a respective driving member undercut.

The elastic fastening assembly can be adjustable between a fastened position in which the elastic fastening assembly has a first length, and a locked position in which the elastic fastening assembly has a second length, the first length being longer than the second length. The protruding portion can continue to protrude into the holder coupling hole, as the elastic fastening assembly is adjusted between the fastened position and the locked position.

The elastic fastening assembly can extend along an elastic fastening assembly axis that is co-axial with the holder through bore axis. The elastic fastening assembly can comprise a fixation member, a rigid member and an elastic biasing member located axially therebetween along the elastic fastening assembly axis.

The fixation member can be axially spaced apart from the rigid member, along the elastic fastening assembly axis, by the elastic biasing member, when the elastic fastening assembly is in the fastened position and has the first length. The fixation member can abut the rigid member, when the elastic fastening assembly in the locked position and has the second length.

BRIEF DESCRIPTION OF THE FIGURES

For a better understanding of the present application and to show how the same may be carried out in practice, reference will now be made to the accompanying drawings, in which:

FIG. 4b is a detailed view of the cutting head shown in FIG. 4a;

Figure 1:
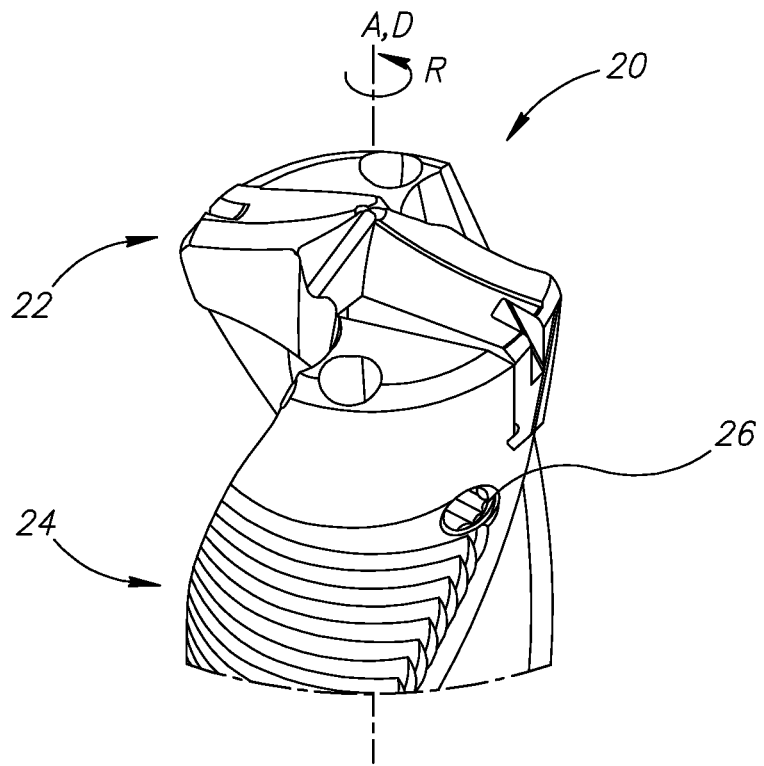
FIG. 1 is a perspective view of a rotary cutting tool in accordance with a first embodiment of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
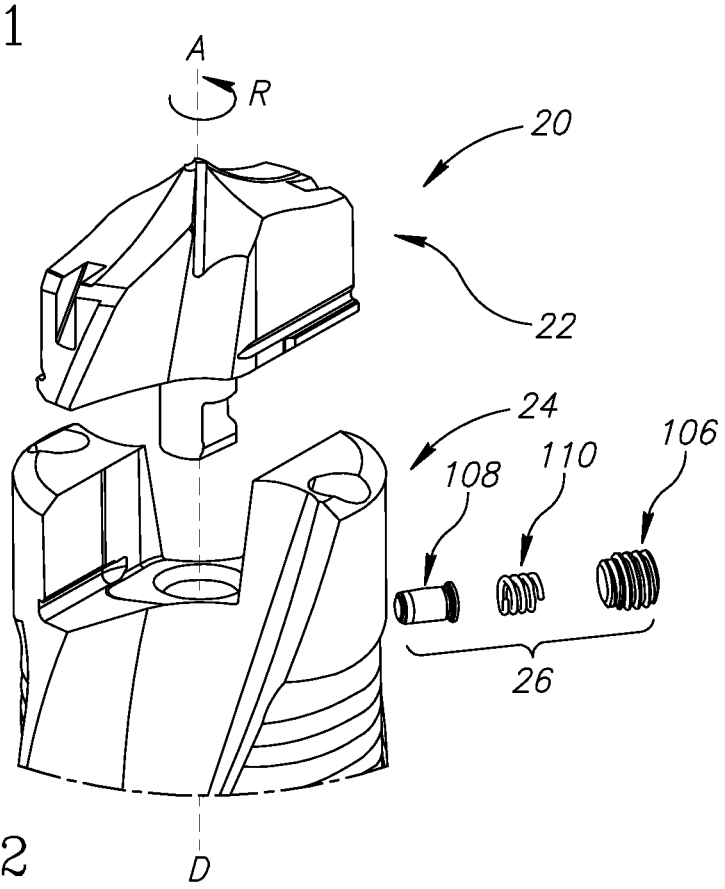
FIG. 2 is an exploded perspective view of the rotary cutting tool shown in FIG. 1.

Attention is first drawn to FIGS. 1 and 2 showing a rotary cutting tool 20, of the type used for drilling operations, in accordance with embodiments of the subject matter of the present application. The rotary cutting tool 20 has a cutting head 22 which can be typically made from cemented carbide. The rotary cutting tool 20 also has a tool holder 24, complimentary to the cutting head 22, which can be typically made from steel. The rotary cutting tool 20 is adjustable, at least, between a released and fastened position. In the fastened position of the rotary cutting tool 20, the cutting head 22 is releasably attached in the tool holder 24, by an elastic fastening assembly 26, 126.

Reference is now made to FIGS. 3 to 7, showing the cutting head 22, in accordance with the subject matter of the present application. The cutting head 22 is made from a unitary integral one-piece construction. The cutting head 22 has a head central axis A about which the cutting head 22 is rotatable in a rotational direction R. In accordance with some embodiments of the subject matter of the present application the head central axis A can be a longitudinal axis. The head central axis A extends in the forward to rearward directions $D_F$, $D_R$. As seen best in FIGS. 4a and 5, the cutting head 22 includes a forward end that forms a cutting portion 28 and a rearward end that forms a head coupling portion 30. It should be understood that use of the terms "forward" and "rearward" throughout the description and claims refer to a relative position in the direction of the head central axis A towards the up and down directions, respectively, in FIGS. 4a and 5.

The cutting portion 28 includes opposing head front and rear surface 32, 34 and a head peripheral surface 36 that extends between the head front and rear surfaces 32, 34. The head central axis A extends through the head front and rear surface 32, 34. The head rear surface 34 defines a boundary between the cutting portion 28 and the head coupling portion 30. The cutting portion 28 includes a head rear abutment surface 38 that faces generally in the rearward direction $D_R$, for abutting a complementary surface on the tool holder 24. The head rear abutment surface 38 is located on the head rear surface 34. In accordance with some embodiments of the subject matter of the present application, the head rear surface 34 can be planar and perpendicular to the head central axis A.

Figure 5:
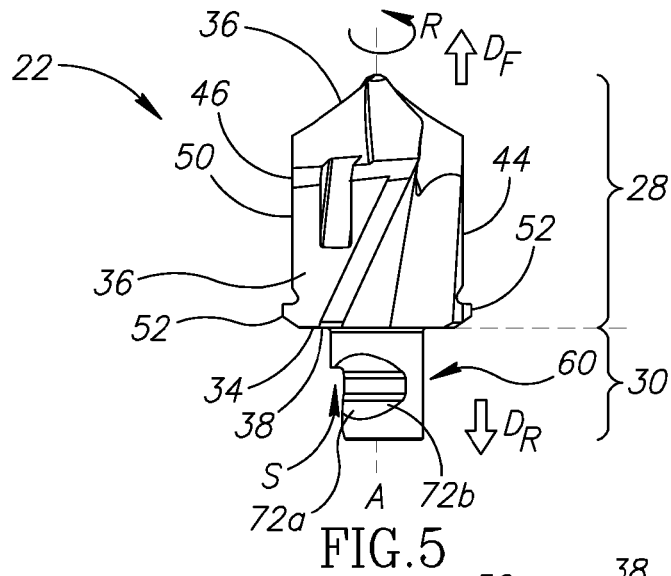
FIG. 5 is a minor side view of the cutting head shown in FIG. 4a, where the cutting head is rotated 90° about a head central axis.
Figure 6:
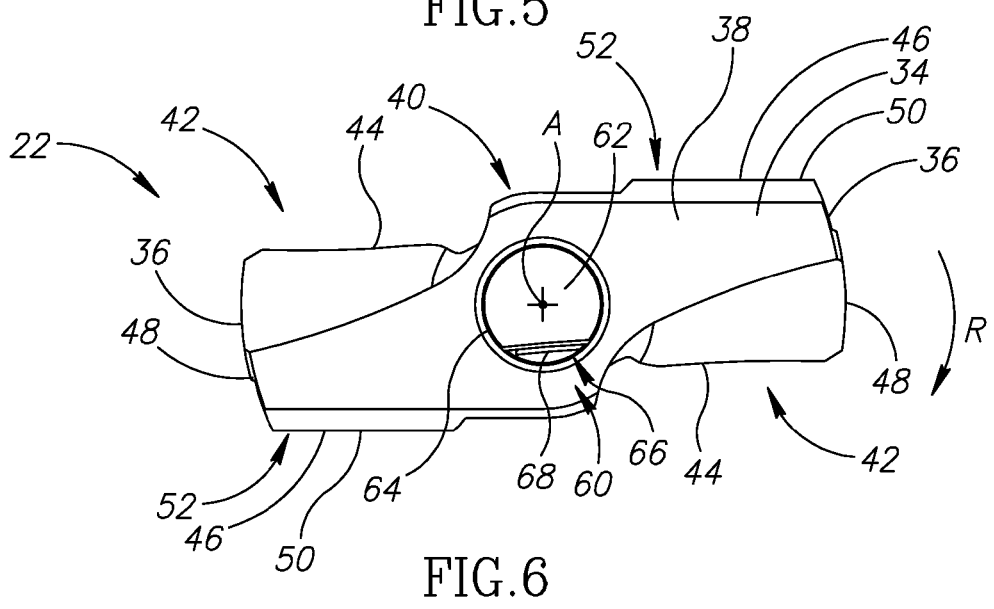
FIG. 6 is a rear view of the cutting head shown in FIG. 3.

The cutting portion 28 includes a head radially central portion 40. The cutting portion 28 includes two cutting arms 42 that extend radially outwards, with respect to the head longitudinal axis A, from the head radially central portion 40. In this non-limiting example shown in the drawings, the cutting portion 28 includes exactly two cutting arms 42, diametrically opposed to each other. Each cutting arm 42 respectively includes opposing arm rotationally leading and trailing surfaces 44, 46 and an arm peripheral surface 48 that extends peripherally between the arm rotationally leading and trailing surfaces 44, 46. The arm rotationally leading and trailing surfaces 44, 46 and the arm peripheral surface 48 are all located on the head peripheral surface 36. It should be understood that use of the terms "rotationally leading" and "rotationally trailing" throughout the description and claims refer to a position relative to the head rotational direction R. Each cutting arm 42 includes a driven surface 50 for driven engagement by a complementary surface on the tool holder 24. As seen in FIG. 5, in this non-limiting example, each driven surface 50 can be planar. Moreover, each driven surface 50 can be parallel to the head central axis A. In accordance with some embodiments of the subject matter of the present application, the driven surfaces 50 can be located on the arm rotationally trailing surfaces 46. Advantageously this allows for effective torque transfer to the cutting head via the driven surfaces 50. The driven surfaces 50 can be spaced apart from the head rear surface 34. Preferably, the driven surfaces 50 can be located axially forward of the head rear surface 34.

Figure 3:
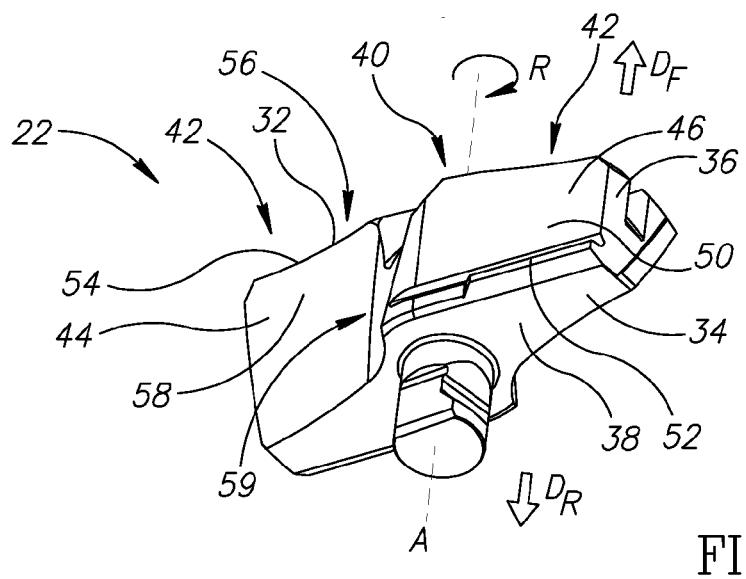
FIG. 3 is a perspective view of a cutting head shown in FIGS. 1 and 2.

As seen best in FIGS. 2, 3 and 5, in accordance with some embodiments of the subject matter of the present application each arm rotationally trailing surface 46 can include a respective arm latch 52 that protrudes from the arm rotationally trailing surface 46. The arm latch 52 can extend in a direction from the head radially central portion 40 to the arm peripheral surface 48. The arm latch 52 can be adjacent the head rear surface 34. The purpose of the arm latch 52 is described further in the description.

Each cutting arm 42 includes a respective major cutting edge 54. The major cutting edge 54 is formed along at least a portion of the intersection of the arm rotationally leading surface 44 and the head front surface 32. The head front surface 32 includes a plurality of major relief surfaces 56. Each major relief surface 56 extends from the respective major cutting edge 54 to which it is associated towards the opposite arm rotationally trailing surface 46 on the same cutting arm 42. Each arm rotationally leading surface 44 includes a respective major rake surface 58. Each major rake surface 58 extends from the major cutting edge 54 to which it is associated towards the head rear surface 34. As is known in the field of rotary cutting tools, each cutting arm 42 can include a cutting arm flute 59, associated to a respective major cutting edge 54, for the evacuation of chips.

Figure 4A:
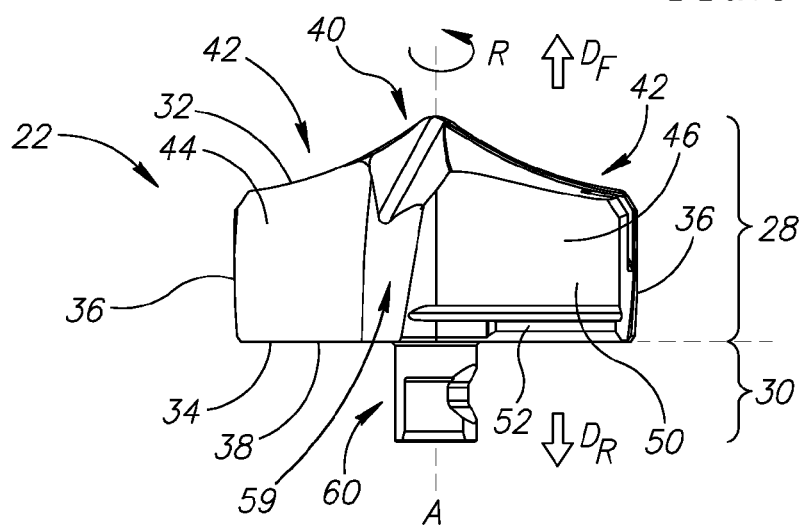
FIG. 4a is a major side view of the cutting head shown in FIG. 3.
Figure 4B:
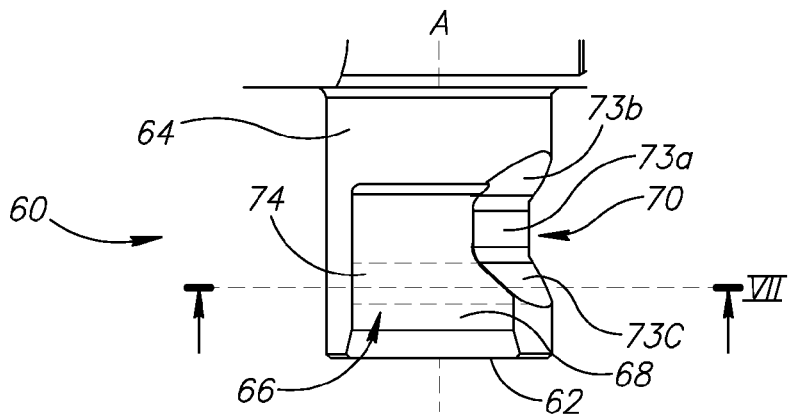

As seen best in FIGS. 4b and 5, the head coupling portion 30 includes a head coupling pin 60 that protrudes rearwardly from the head rear surface 34 along the head central axis A. The purpose of the head coupling pin 60 is to provide a coupling means with the tool holder 24. The head coupling pin 60 includes a pin rear surface 62 that is spaced apart from the head rear surface 34 and a pin peripheral surface 64 that extends between the pin rear surface 62 and the head rear surface 34. In accordance with some embodiments of the subject matter of the present application the pin peripheral surface 64 can have a cylindrical shape. The head rear surface 34 can form a peripheral boundary of the pin peripheral surface 64 at the region where the head coupling pin 60 protrudes from the head rear surface 34. The head coupling pin 30 may not be rotationally symmetrical about the head central axis A. The head coupling pin 30 may not be mirror symmetrical about a plane containing the head central axis A.

The head coupling pin 60 includes a guiding recess 66 that is recessed in the pin peripheral surface 64. The guiding recess 66 opens out to the pin rear surface 62. In accordance with some embodiments of the subject matter of the present application the guiding recess 66 can extend longitudinally in the direction along the head central axis A. The guiding recess 66 can be spaced apart from the head rear surface 34 and thus the cutting arm flutes 59 may not extend to a respective guiding recess 66.

As shown in, for example, U.S. Pat. No. 7,625,161, in accordance with some embodiments of the subject matter of the present application, portions of the head coupling pin 60 can form part of fluted sections (configured for chip evacuation) of the assembled rotary cutting tool 20. For example, the guiding recesses 66 can form part of the said fluted sections and are shaped accordingly. Thus, the head coupling pin 60 can be fluted. In accordance with some other embodiments of the subject matter of the present application, the head coupling pin 60 can be non-fluted, where portions of the head coupling pin 60 may not form part of fluted sections of the assembled rotary cutting tool 20. Advantageously, such a configuration provides a strong and robust head coupling pin 60 and permits the coupling hole (that receives the head coupling pin 60) to be fully circumferentially closed (where the head coupling pin 60 is not visible when the rotary cutting tool 20 is in the fastened or locked positions), thus providing a more rigid coupling arrangement on the tool holder 24 compared to a coupling hole that is not fully circumferentially closed.

Figure 14A:
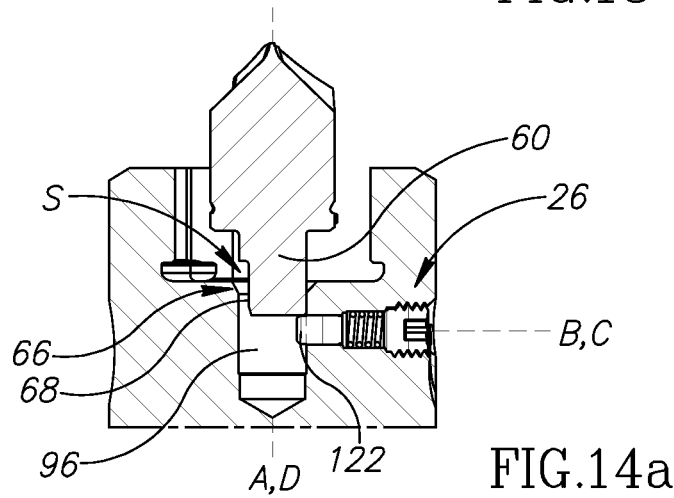
FIG. 14a is an analogous cross-sectional view shown in FIG. 12a, when the rotary cutting tool is in a released position.
Figure 14B:
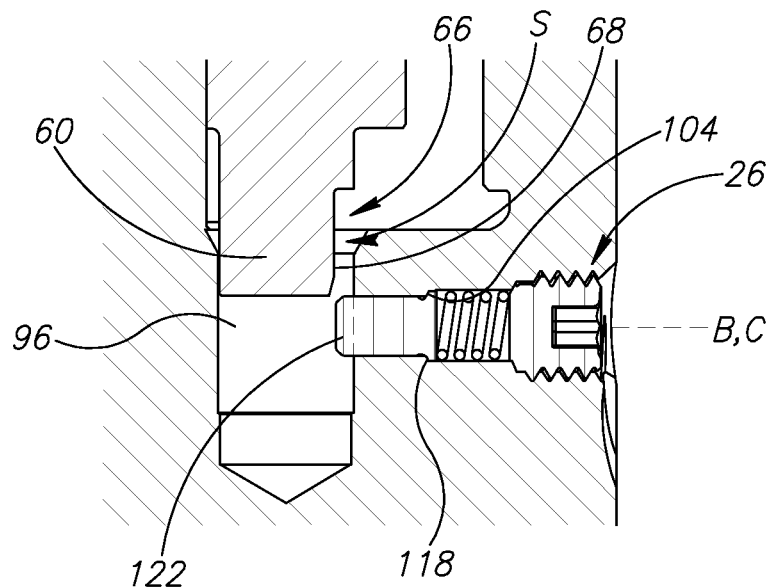
FIG. 14b is a detailed view of an analogous cross-sectional view shown in FIG. 12a, when the rotary cutting tool is in another released position.
Figure 15:
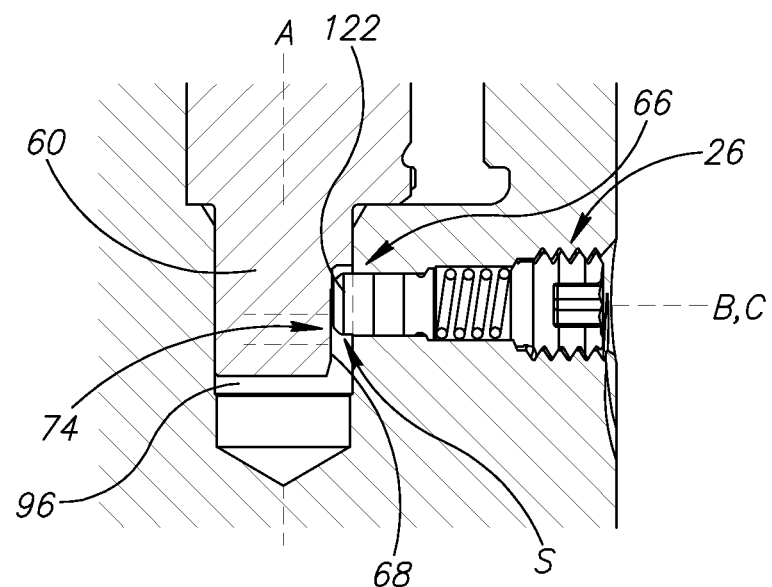
FIG. 15 is a detailed view of an analogous cross-sectional view shown in FIG. 12a, when the rotary cutting tool is in a guided position.

The guiding recess 66 includes a guiding surface 68. As seen in FIGS. 5, 14b and 15, the guiding surface 68 defines a clearance space S for receipt of the elastic fastening assembly 26, 126, when assembling the rotary cutting tool 20. The guiding surface 68 extends in a forward axial direction from the pin rear surface 62 towards the cutting portion 28. In accordance with some embodiments of the subject matter of the present application the guiding surface 68 can be planar. The guiding surface 68 can be parallel to the head central axis A. The intersection of the guiding surface 68 and the pin rear surface 62 can be beveled to allow easy initial insertion of the elastic fastening assembly 26, 126 when assembling the rotary cutting tool 20.

Referring back to FIG. 4b, the head coupling pin 60 includes a fastening recess 70. The fastening recess 70 is recessed in the pin peripheral surface 64. In accordance with some embodiments of the subject matter of the present application, as seen in a minor side view of the cutting head, the fastening recess 70 can extend in a direction perpendicular to the head central axis A. The fastening recess 70 can be spaced apart from the pin rear surface 62. The fastening recess 70 can be spaced apart from the head rear surface 34.

The fastening recess 70 includes a lower inclined surface 73c which diverges rearwardly with respect to the head central axis A, and is therefore radially outwardly sloped relative to the head central axis A, in the rearward direction $D_R$ of the cutting head 22. In the non-limiting example shown in the drawings, the fastening recess 70 can include a middle surface 73a that is delimited on either side by an upper inclined surface 73b and the lower inclined surface 73c, the upper and lower inclined surfaces 73b, 73c being inclined with respect to the middle surface 73a. It is noted that to simplify manufacturing of the cutting head 22, the fastening recess 70 can be a cutout and thus the middle surface 73a and upper and lower inclined surfaces 73b, 73c can all be planar.

At least a portion of the lower inclined surface 73c axially overlaps an overlapping region 74 of the guiding surface 68. In accordance with some embodiments of the subject matter of the present application, the overlapping region 74 can be located in a mid-region of the guiding surface 68, as measured in the direction of the head central axis A. The aforementioned portion of the lower inclined surface 73c that axially overlaps an overlapping region 74 of the guiding surface 68 includes a fastening surface 72a, for elastic engagement by the elastic fastening assembly 26, 126 that therefore also axially overlaps the overlapping region 74. The fastening surface 72a is angularly closer to said overlapping region 74 in the direction opposite the rotational direction R than in the rotational direction R. In accordance with some embodiments of the subject matter of the present application, the fastening surface 72a can be located in a portion of the lower inclined surface 73c that is closest to the overlapping region 74 of the guiding surface 68 in a direction opposite the rotational direction R. When, for example, fastening recess 70 extends longitudinally in a direction about the head central axis A, the fastening surface 72a can be located at a rotationally trailing region of the lower inclined surface 73c. The fastening surface 72a can be angularly spaced apart from the overlapping region 74 by between 0° and 20°.

In a cross-sectional view taken in a plane perpendicular to the head central axis A, and through the fastening surface 72a, and viewed in a forward direction (i.e. FIG. 7), a radial line LR, extending from the head central axis A and through the fastening surface 72a can form an acute fastening angle θ with the fastening surface 72a, the acute fastening angle θ being measured in a counter-clockwise direction, and therefore the fastening surface 72a can be radially inwardly sloped relative to the head central axis A, in the rotational direction R. It is noted that by virtue of being located on the lower inclined surface 73c, the fastening surface 72a is also radially outwardly sloped relative to the head central axis A, in the rearward direction $D_R$ of the cutting head 22. In accordance with some embodiments of the subject matter of the present application, the fastening surface 72a can be planar.

Figure 7:
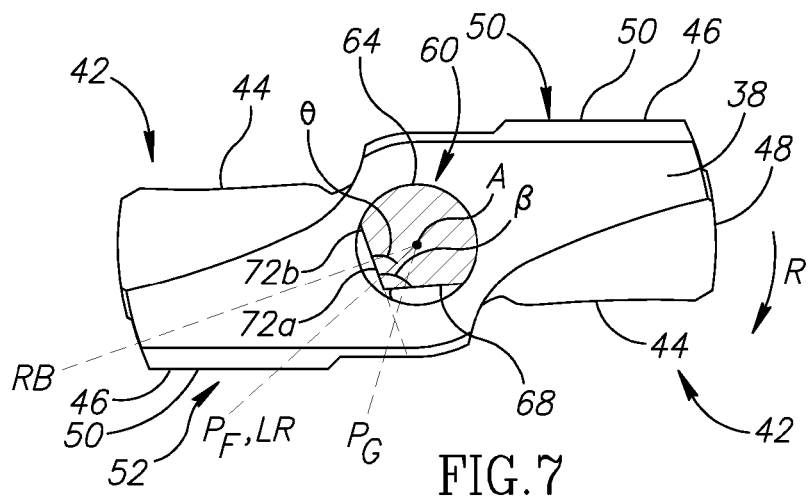
FIG. 7 is a cross-sectional view of the rotary cutting tool taken along the line VII-VII in FIG. 4b.
Figure 12A:
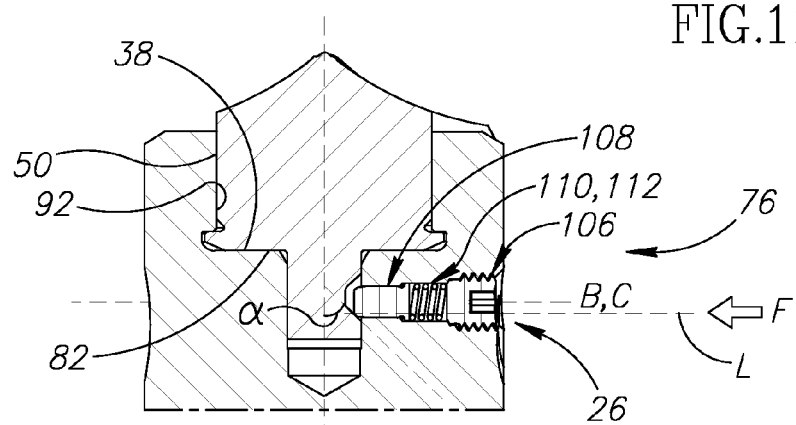
FIG. 12a is a cross-sectional view of the rotary cutting tool taken along the line XIIa-XIIa in FIG. 11 showing an elastic fastening assembly.

As seen in FIG. 7, in a cross-sectional view taken in a plane perpendicular to the head central axis A through the fastening recess 70, the fastening recess 70 can subtend an acute angle at the head central axis A. As seen in FIG. 12a, in a cross-sectional view taken in a plane containing the head central axis A though the fastening surface 72a, the fastening surface 72a can define an internal fastening surface angle α with respect to the head central axis A. The fastening surface angle α can be greater than 40° and less than 50°.

The lower inclined surface 73c can include a non-fastening surface 72b. The non-fastening surface 72b can be formed on a rotationally leading portion of the lower inclined surface 73c and can be adjacent to the fastening surface 72a in the rotational direction R. In this non-limiting example, in a cross-sectional view taken in a plane perpendicular to the head central axis A and through the fastening surface 72a, (i.e. FIG. 7), the fastening surface 72a and the non-fastening surface 72b define a major portion of a chord, and the fastening surface 72a is located on one side of a radial bisector RB of said chord, and the non-fastening surface 72b is located on the other side of said radial bisector RB. It is noted that, in this non-limiting example, the fastening surface 72a uniformly transforms into the non-fastening surface 72b. However, generally speaking, the non-fastening surface 72b can be oriented differently with respect to the fastening surface 72a as long as other factors, such as, for example, overall strength of the head coupling pin 60 are not affected.

In accordance with some embodiments of the subject matter of the present application, as shown in FIG. 7, a fastening axial half-plane $P_F$ extends from the head central axis A and intersects the fastening surface 70a. A guiding axial half-plane $P_G$ extends from the head central axis A and intersects a portion of the guiding recess 66 that is circumferentially closest to the fastening surface 72a in a direction opposite the rotational direction R. In accordance with some embodiments of the subject matter of the present application, the fastening axial half-plane $P_F$ can intersect one of the driven surfaces 50. The guiding and fastening axial half-planes $P_G$, $P_F$ can both intersect the same driven surface 50.

The fastening recess 70 and the guiding recess 66 can intersect each other, and thus the guiding and fastening recesses 66, 70 are non-diametrically opposed. Specifically, the overlapping region 74 of the guiding surface 68 can intersect the fastening surface 72a. The middle surface 73a of the fastening recess 70 can intersect the guiding surface 68. In a cross-sectional view taken in a plane perpendicular to the head central axis A and through the fastening surface 72a (i.e. FIG. 7), the guiding surface 68 and the fastening surface 72a define an internal recess angle β. The recess angle β can be in the range $85° \leq \beta \leq 125°$. While in FIGS. 4b and 7, the overlapping region 74 of the guiding surface 68 is shown to intersect the fastening surface 72a at a distinct edge, the transition between the two may, in other embodiments, be more rounded or even comprise one or more narrow intervening surfaces.

Another aspect of the subject matter of the present application includes a tool holder assembly 76. The tool holder assembly 76 includes the tool holder 24, for releasably attaching the cutting head 22 thereto, and the elastic fastening assembly 26, 126 releasably engaged to the tool holder 24.

Figure 8:
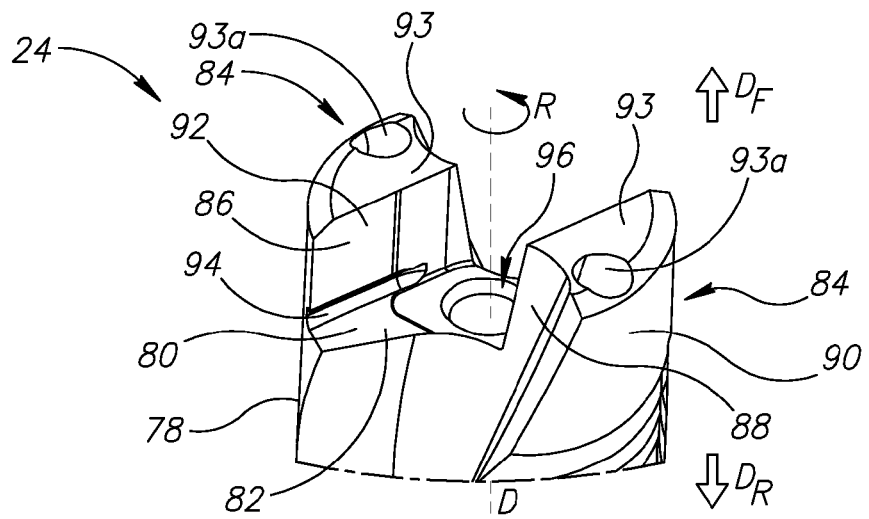
FIG. 8 is a perspective view of a tool holder shown in FIGS. 1 and 2.
Figure 9:
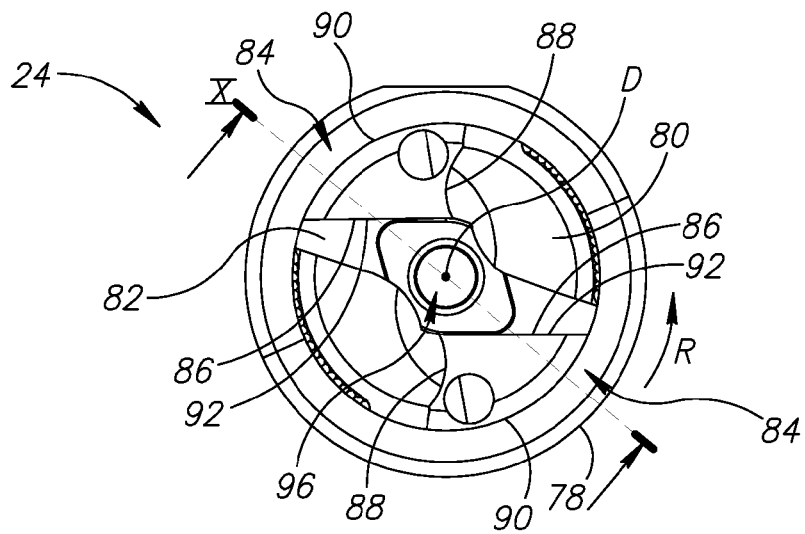
FIG. 9 is a front view of the tool holder shown in FIG. 8.
Figure 10:
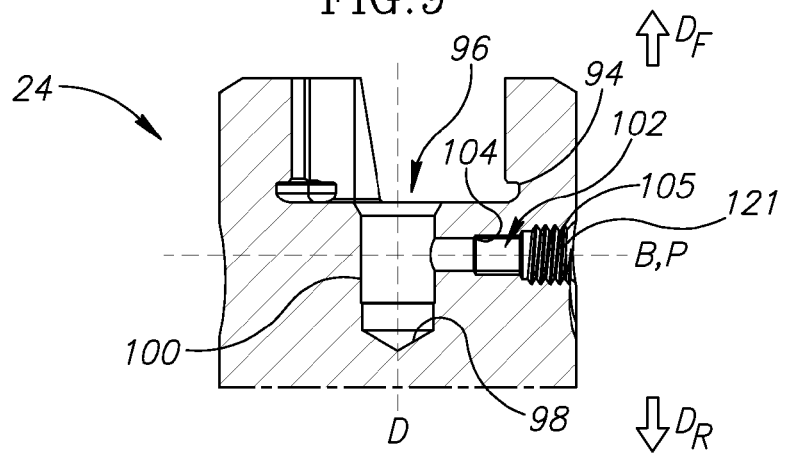
FIG. 10 is a cross-sectional view of the tool holder taken along the line X-X in FIG. 9
Figure 11:
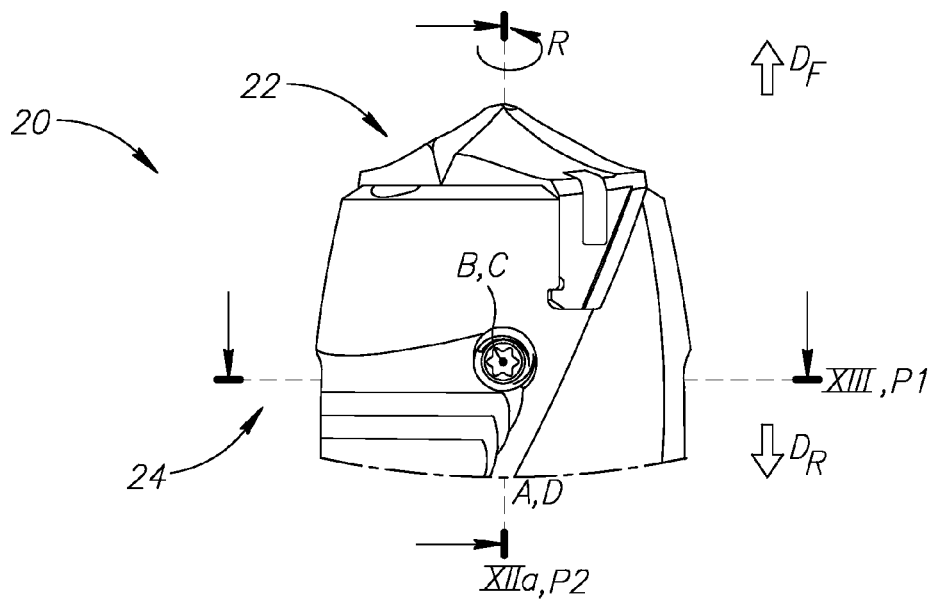
FIG. 11 is a side view of the rotary cutting tool, in a fastened position, shown in FIG. 1.

Attention is drawn to FIGS. 8 and 10 showing the tool holder 24, in accordance with the subject matter of the present application. The tool holder 24 has a holder longitudinal axis D that extends in the forward to rearward direction $D_F$, $D_R$ and about which the tool holder 24 is rotatable in the rotational direction R. The tool holder 24 includes a holder peripheral surface 78 that extends circumferentially along the holder longitudinal axis D. The holder peripheral surface 78 forms a boundary of a holder base surface 80 at a forward end of the tool holder 24. The holder longitudinal axis D extends through the holder base surface 80. The tool holder 24 includes a holder base abutment surface 82 that faces generally in the forward direction $D_F$, for abutting a complementary surface on the cutting head 22. The holder base abutment surface 82 is located on the holder base surface 80. In accordance with some embodiments of the subject matter of the present application, the holder base surface 80 can be planar and perpendicular to the holder longitudinal axis D.

The tool holder 24 includes two circumferentially spaced apart driving members 84 that extend forwardly from the holder base surface 80. The driving members 84 serve to impart a cutting torque $T_C$ to the cutting head 22 when the tool holder 24 rotates. In this non-limiting example shown in the drawings, the tool holder 24 includes exactly two driving members 84, diametrically opposed to each other. Each driving member 84 includes opposing driving member rotationally leading and trailing surfaces 86, 88 and a driving member peripheral surface 90 that extends peripherally between the driving member rotationally leading and trailing surfaces 86, 88. In accordance with some embodiments of the subject matter of the present application, each driving member 84 can include a respective driving member front surface 93 that axially delimits the driving member 84 in the forward direction $D_F$. A respective cooling duct 93a can open out to each driving member front surface 93. The cooling ducts 93a can open out to the driving member front surfaces 93.

The driving member rotationally leading surface 86 includes a driving surface 92 for driven engagement with a respective complementary surface on the cutting head 22. In accordance with some embodiments of the subject matter of the present application, the driving surfaces 92 can be located axially forward of the holder base surface 80. Each driving member rotationally leading surface 86 can include a respective driving member undercut 94 that is recessed from driving member rotationally leading surface 86. Each driving member undercut 94 can extend in a direction from the holder longitudinal axis D to the driving member peripheral surface 90. Each driving member undercut 94 can be adjacent the holder base surface 80. The purpose of the driving member undercut 94 is described further in the description.

The tool holder 24 includes a holder coupling hole 96, for receipt of the head coupling pin 60 of the cutting head 22. The holder coupling hole 96 is recessed in the holder base surface 80 and extends along the holder longitudinal axis D in the rearward direction $D_R$. The holder coupling hole 96 includes a coupling hole rear surface 98 that is spaced apart from the holder base surface 80 and a coupling hole peripheral surface 100 that extends between the coupling hole rear surface 98 and the holder base surface 80. In accordance with some embodiments of the subject matter of the present application the coupling hole peripheral surface 100 can have a cylindrical shape. The intersection of the coupling hole peripheral surface 100 and the holder base surface 80 can be beveled to allow easy initial insertion of the head coupling pin 60 when assembling the rotary cutting tool 20.

Figure 13:
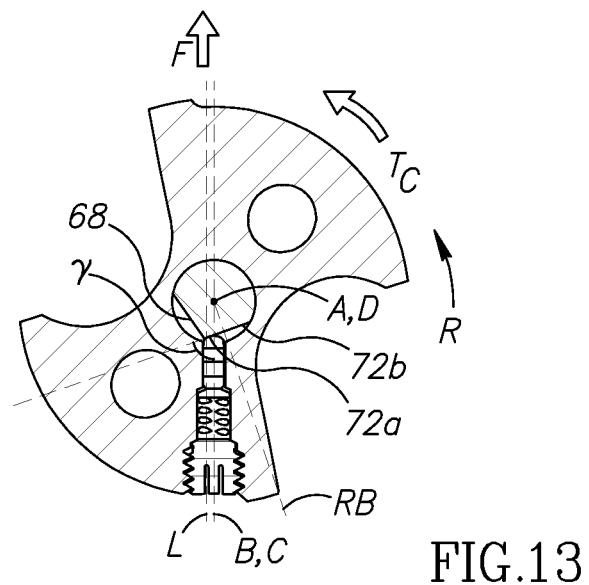
FIG. 13 is a cut view of the rotary cutting tool taken along the line XIII-XIII in FIG. 11.

The tool holder 24 includes a holder through bore 102 that extends along a holder through bore axis B from the holder coupling hole 96 to the holder peripheral surface 78. In accordance with some embodiments of the subject matter of the present application, as seen in FIG. 12a, the holder through bore axis B can lie in a holder plane P perpendicular to the holder longitudinal axis D. As seen in FIG. 13, the holder through bore axis B can intersect the holder longitudinal axis D. The holder through bore 102 can include a bore stop surface 104 that faces generally towards the holder peripheral surface 78. Preferably, the bore stop surface 104 is annular. The holder through bore 102 can include a bore fixation region 105, for releasably attaching the elastic fastening assembly 26,126 thereto. The bore fixation region 105 is located closer to the holder peripheral surface 78 than the bore stop surface 104. In this non-limiting example the bore fixation region 105 is adjacent the holder peripheral surface 78. The purpose of the bore stop surface 104 and the bore fixation region 105 is described hereinafter.

Figure 12B:
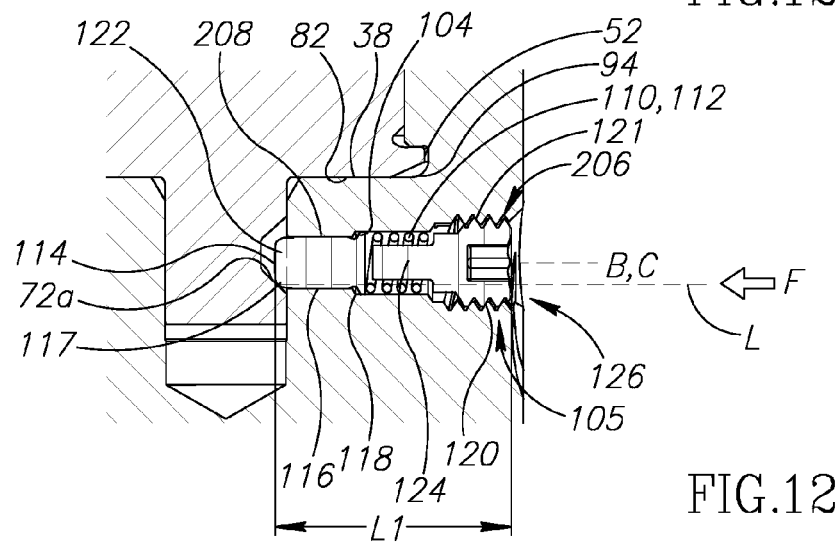
FIG. 12b is a detailed view of an analogous cross-sectional view shown in FIG. 12a, showing another elastic fastening assembly.

Referring now to FIGS. 12*a* and 12*b*, the tool holder assembly 76 includes the elastic fastening assembly 26, 126, for elastic engagement with the fastening surface 72*a* of the head coupling pin 60. The elastic fastening assembly 26, 126 is releasably engaged to the tool holder 24 at the holder through bore 102. The elastic fastening assembly 26, 126 extends along an elastic fastening assembly axis C that is co-axial with the holder through bore axis B. In accordance with some embodiments of the subject matter of the present application, the elastic fastening assembly 26, 126 can include a fixation member 106, 206, a rigid member 108 and an elastic biasing member 110 that is located axially therebetween along the elastic fastening assembly axis C. By virtue of the biasing member 110, the elastic fastening assembly 26, 126 can have variable length along the elastic fastening assembly axis C. and thus may be considered a variable-length elastic fastening assembly 26, 126. The elastic biasing member 110 can be a biasing spring 112.

The rigid member 108 can include an end surface 114 that is perpendicular to the elastic fastening assembly axis C and a side surface 116 that extends circumferentially along the elastic fastening assembly axis C and that circumferentially bounds the end surface 114. The end surface 114 and the side surface 116 can intersect to form a beveled surface 117. The elastic fastening assembly axis C does not intersect the beveled surface 117. The rigid member 108 can include a shoulder surface 118 that faces generally away from the fixation member 106, 206. Preferably, the shoulder surface 118 is annular. The elastic fastening assembly 26, 126 is releasably engaged to the tool holder 24 by the fixation member 106, 206 at the bore fixation region 105. In this non-limiting example, the fixation member 106, 206 can include an external threaded portion 120, and the bore fixation region 105 can include an internal threaded portion 121, and the external threaded portion 120 is threadingly engaged with the internal threaded portion 121. The fixation member 106, 206 also serves as a fixed resistive means so that the elastic biasing member 110 urges the rigid member 108 in a direction away from the fixation member 106, 206 until the bore stop surface 104 abuts the shoulder surface 118. In this position, a protruding portion 122 of the elastic fastening assembly 26, 126, located on the rigid member 108, protrudes into the holder coupling hole 96.

In the case when the elastic biasing member 110 is a biasing spring 112, the fixation member 206 can include a locking portion 124 that extends towards the rigid member 108 through the biasing spring 112. The fixation member 206 can be displaceable along the holder through bore axis B. In this non-limiting example, the axial displacement is achieved by the respective screwing and unscrewing of the fixation member 206 in and out of the holder through bore 102.

Yet another aspect of the subject matter of the present application includes the rotary cutting tool 20, having the tool holder 24 and the cutting head 22 releasably attached thereto by the elastic fastening assembly 26, 126. Referring now to FIGS. 12*a-b* and 14*a-b*, the rotary cutting tool 20 is adjustable between a released position and a fastened position.

In the released position of the rotary cutting tool 20 the head coupling pin 60 is not located in the holder coupling hole 96. The cutting head 22 is not releasably attached in the tool holder 24.

In the fastened position of the rotary cutting tool 20, the cutting head 22 is releasably attached in the tool holder 24, by the elastic fastening assembly 26, 126. The head coupling pin 60 is located in the holder coupling hole 96. The head central axis A and the holder longitudinal axis D are co-axial. Each cutting arm 42 is in contact with a respective driving member 84. Specifically, each driven surface 50 abuts a respective driving surface 92. The elastic fastening assembly 26, 126 abuts the fastening surface 72*a*. Thus, the elastic fastening assembly 26, 126 elastically engages the fastening surface 72*a*. It should further be noted that in the embodiment where the elastic fastening assembly 26, 126 includes the beveled surface 117, it is a portion of the beveled surface 117 that abuts the fastening surface 72*a*. The bore stop surface 104 does not abut the shoulder surface 118. The head rear abutment surface 38 abuts the holder base abutment surface 82. It is noted that in fastened position, the elastic fastening assembly 26, 126 is not located in the guiding recess 66. Moreover, the guiding surface 68 is non-abutted.

In accordance with some embodiments of the subject matter of the present application, the head coupling pin 60 can include exactly one guiding recess 66 and exactly one fastening recess 70. The tool holder 24 can include exactly one holder through bore 102 and exactly one elastic fastening assembly 26, 126 releasably engaged to the tool holder 24. Thus, advantageously, only one fastening member is required to securely attach the cutting head 22 to the tool holder 24. For example, there is no requirement for an additional separate retaining screw for securely clamping the cutting head 22 to the tool holder 24, as disclosed in US 2011/110739. In this configuration a portion of the pin peripheral surface 64 diametrically opposite the fastening surface 72*a* abuts a portion of the coupling hole peripheral surface 100 diametrically opposite the holder through bore 102.

Referring now to FIG. 15, the rotary cutting tool 20 is adjustable between the released position and the fastened position via a guided position. In the guided position of the rotary cutting tool 20 the head coupling pin 60 is located in the holder coupling hole 96. The protruding portion 122 of the elastic fastening assembly 26, 126 is located in the guiding recess 66.

Figure 12C:
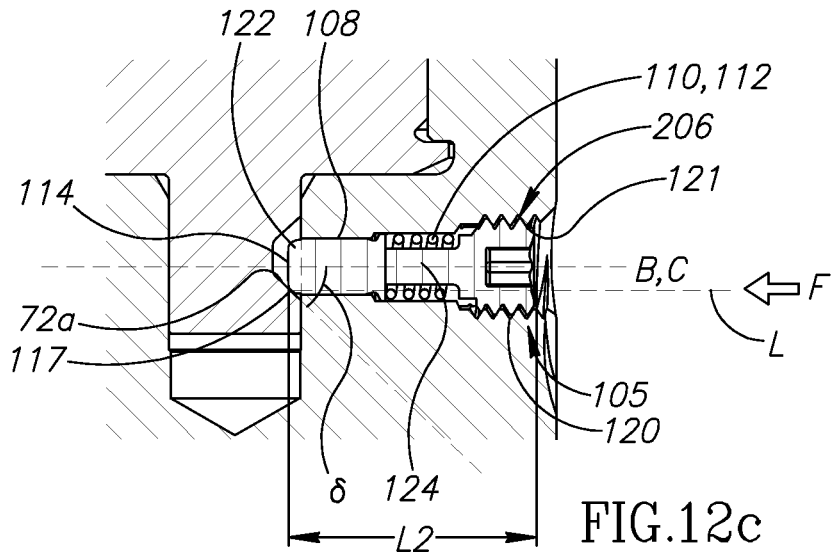
FIG. 12c is a detailed view of an analogous cross-sectional view shown in FIG. 12a, when the rotary cutting tool is in a locked position.

Referring now to FIG. 12*c*, the rotary cutting tool 20 can be further adjustable between the fastened position and a locked position. In the locked position of the rotary cutting tool 20, the cutting head 22 is releasably attached to the tool holder 24 by the elastic fastening assembly 126. The head coupling pin 60 is located in the holder coupling hole 96. Each cutting arm 42 is in contact with a respective driving member 84. Specifically, each driven surface 50 abuts a respective driving surface 92. The locking portion 124 abuts the rigid member 108. The elastic fastening assembly 126 clampingly engages the fastening surface 72*a*, and the locking portion 124 resists outward motion of the rigid member 108. Thus, the rigid member 108 cannot yield in a direction towards the fixation member 206. It is noted that in this position the bore stop surface 104 does not abut the shoulder surface 118.

It is understood from the above that the elastic fastening assembly 26, 126 can have a first length L1 when in the fastened position and a second length L2 when in the locked position. In the embodiment shown, the second length L2 is shorter than the first length L1. And upon returning from the locked position to the fastened position, the first length L1 can be restored. It is further understood that the elastic fastening assembly 26, 126 can be adjusted between the fastened and released positions while its protruding portion 122 continues to protrude into the holder coupling hole 96.

Assembly of the rotary cutting tool 20 is accomplished by performing the following steps. The head coupling pin 60 is positioned axially forward of, and facing towards, the holder coupling hole 96 such that the guiding surface 68 is circumferentially aligned with the protruding portion 122 of the elastic fastening assembly 26, 126. It should be noted that in this position each cutting arm 42 is located axially forward and circumferentially between, each adjacent pair of driving member 84 (as best seen in FIG. 2). The cutting head 22 is then displaced rearwardly so that the head coupling pin 60 is initially inserted in the holder coupling hole 96 (see FIG. 14b). The cutting head 22 is then displaced further rearwardly until the head rear surface 34 initially comes into contact with the holder base surface 80 and the elastic fastening assembly 26, 126 is received in the guiding recess 66.

In this position the cutting tool 20 is in the guided position. It is noted that the clearance space S, defined by the guiding surface 68, allows the protruding portion 122 to be received in the guiding recess 66 (see FIG. 15). If the guiding surface 68 is not circumferentially aligned with the protruding portion 122 the head coupling pin 60 cannot be inserted into the holder coupling hole 96 (see FIG. 14a). Thus, in the embodiment when there is exactly one guiding recess 66, the head coupling pin 60 can be inserted into the holder coupling hole 96 in only one rotational position with respect to the head central axis A. As the cutting head 22 is displaced rearwardly, the protruding portion 122 may come into contact with the guiding surface 68. However, this contact does not prevent further rearward displacement of the cutting head 22. It should also be noted that the cutting arms 42 and the driving members 84 are so designed so that there is adequate space between each adjacent pair of driving members 84 to allow the placement of a cutting arm 42.

To adjust the cutting tool 20 into the fastened position, the cutting head 22 is now rotated in a direction against the rotational direction R, relative to the tool holder 24, until the protruding portion 122 of the elastic fastening assembly 26, 126 initially comes into contact with the fastening surface 72a. The elastic fastening assembly 26, 126 exerts a fastening force F along a line of force L on the fastening surface 72a. The line of force L is parallel to the elastic fastening assembly axis C and the holder through bore axis B. The cutting head 22 is further rotatable in a direction opposite the rotational direction R until the protruding portion 122 contacts the fastening surface 72a in a contact region and each driving surface 50 abuts a respective driven surface 92, forming a fastened position of the rotary cutting tool 20.

As seen in FIG. 12c (showing the locked position of the rotary cutting tool 20, but also applicable for the fastened position of the rotary cutting tool 20), in a cross-sectional view taken in a second tool plane P2 containing the head central axis A and the holder through bore axis B, the holder through bore axis B forms an acute external second angle δ with the fastening surface 72a. By virtue of the fastening surface 72a, and thus the contact region, diverging rearwardly with respect to the head central axis A (i.e., being radially outwardly sloped relative to the head central axis A, in the rearward direction $D_R$ of the cutting head 22), the fastening force F urges the cutting head 22 in the rearward direction $D_R$.

Attention is returned to FIG. 13, showing the cross-section of an embodiment in which the through bore axis B lies in a first tool plane P1, which plane is perpendicular to the holder longitudinal axis D and intersects the fastening surface 72a. As seen in this figure, in the fastened position of the rotary cutting tool 20, the holder through bore axis B forms an acute first angle γ with the fastening surface 72a, the acute first angle γ being measured in a direction opposite the rotational direction R. As a result, the contact region is slightly rotationally behind the holder through bore axis B and the elastic fastening assembly axis C. By virtue of the contact region being slightly rotationally behind the holder through bore axis B and the elastic fastening assembly axis C, the fastening force F urges the cutting head 22 in a direction opposite the rotational direction R.

It is noted that the magnitude of fastening force F is sufficient to securely couple the cutting head 22 to the tool holder 24, in the fastened position of the rotary cutting tool 20. That is to say, the locked position of the rotary cutting tool 20 is optional, and the rotary cutting tool 20 can be operational for metal cutting when in the fastened position. It is further noted that adjustment between the guided position and the fastened position of the rotary cutting tool 20, requires a rotation of the cutting head 22 of no more than 90°. Advantageously, the fastened position is attained in a self-lock manner and click-fit manner.

In the embodiment of the cutting tool 20 where cutting head 22 that includes an arm latch 52 and the tool holder 24 includes a driving member undercut 94, in the fastened position of the rotary cutting tool 20 the arm latch is located in the undercut. Advantageously, this prevents axial pullout of the cutting head 22 from the tool holder 24, when the rotary cutting tool 20 is removed from a workpiece.

In accordance with some embodiments of the subject matter of the present application, the fixation member 206 is displaceable along the holder through bore axis B towards the rigid member until the locking portion 124 abuts the rigid member 108. Advantageously, in this locked position of the rotary cutting tool 20, firm clamping engagement of the cutting head 22 is attained. The rigid member 108 cannot be displaced towards the fixation member 206 when urged to do so, for example, by the fastening surface 72a when the cutting head 22 is removed from a work piece. Advantageously, this also prevents axial pull-out of the cutting head 22 from the tool holder 24 when the rotary cutting tool 20 is removed from a workpiece.

What is claimed is:

1. A rotary cutting tool (20) comprising:
   a cutting head (22) having a head central axis (A) defining a forward to rearward direction ($D_F$, $D_R$) and about which the cutting head (22) is rotatable in a rotational direction (R), the cutting head (22) comprising a forward end forming a cutting portion (28) and a rearward end forming a head coupling portion (30);
   the cutting portion (28) comprising:
      a head rear surface (34), defining a boundary between the cutting portion (28) and the head coupling portion (30);
      a head rear abutment surface (38), located on the head rear surface (34);

two cutting arms (42) extending radially with respect to the head central axis (A), each comprising a driven surface (50); and the head coupling portion (30) comprising a head coupling pin (60), protruding rearwardly from the head rear surface (34) along the head central axis (A), the head coupling pin (60) comprising:

a pin rear surface (62) spaced apart from the head rear surface (34) and a pin peripheral surface (64) extending therebetween;

a guiding recess (66), recessed in the pin peripheral surface (64), opening out to the pin rear surface (62), and comprising a guiding surface (68) extending in a forward axial direction from the pin rear surface (62) towards the cutting portion (28); and a fastening recess (70), recessed in the pin peripheral surface (64), and comprising a lower inclined surface (73*c*) which is radially outwardly sloped relative to the head central axis (A), in the rearward direction ($D_R$) of the cutting head (22); wherein at least a portion of the lower inclined surface (73*c*) axially overlaps an overlapping region (74) of the guiding surface (68), said portion comprising a fastening surface (72*a*) that is angularly closer to said overlapping region (74) in the direction opposite the rotational direction (R) than in the rotational direction (R); and a tool holder (24), having a holder longitudinal axis (D), extending in the forward to rearward direction ($D_F$, $D_R$) and about which the tool holder (24) is rotatable in the rotational direction (R), the tool holder (24) comprising:

a holder peripheral surface (78) extending circumferentially along the holder longitudinal axis (D) and forming a boundary of a holder base surface (80) at a forward end of the tool holder (24);

two circumferentially spaced apart driving members (84) extending forwardly from the holder base surface (80);

a holder coupling hole (96) recessed in the holder base surface (80) and extending along the holder longitudinal axis (D) in the rearward direction ($D_R$); and a holder through bore (102) extending along a holder through bore axis (B) from the holder coupling hole (96) to the holder peripheral surface (78); and an elastic fastening assembly (26, 126) releasably engaged to the tool holder (24) at the holder through bore (102), and having a protruding portion (122) protruding into the holder coupling hole (96); wherein the rotary cutting tool (20) is adjustable between a guided position and a fastened position, wherein:

in the guided position:
the head coupling pin (60) is located in the holder coupling hole (96); and
the protruding portion (122) is located in the guiding recess (66); and in the fastened position:
the cutting head (22) is releasably attached to the tool holder (24) by the elastic fastening assembly (26, 126);
the head coupling pin (60) is located in the holder coupling hole (96);
each cutting arm (42) is in contact with a respective driving member (84); and
the elastic fastening assembly (26, 126) elastically engages the fastening surface (72*a*).

2. The rotary cutting tool (20), according to claim 1, wherein the fastening surface (72*a*) is radially inwardly sloped relative to the head central axis (A), in the rotational direction (R) of the cutting head (22).

3. The rotary cutting tool (20), according to claim 1, wherein
a fastening axial half-plane ($P_F$) extending from the head central axis (A) intersects the fastening surface (72*a*); and
the fastening axial half-plane ($P_F$) intersect one of the driven surfaces (50).

4. The rotary cutting tool (20), according to claim 1, wherein the fastening surface (72*a*) is located in a portion of the lower inclined surface (73*c*) that is closest to the overlapping region (74) of the guiding surface (68) in a direction opposite the rotational direction (R).

5. The rotary cutting tool (20), according to claim 1, wherein the guiding surface (68) is planar and parallel to the head central axis (A).

6. The rotary cutting tool (20), according to claim 1, wherein the overlapping region (74) of the guiding surface (68) intersects the fastening surface (72*a*).

7. The rotary cutting tool (20), according to claim 1, wherein the fastening surface (72*a*) is planar.

8. The rotary cutting tool (20), according to claim 1, wherein the head coupling pin (60) comprises exactly one guiding recess (66) and exactly one fastening recess (70).

9. The rotary cutting tool (20), according to claim 1, wherein
the tool holder (24) comprises a holder base abutment surface (82), located on the holder base surface (80); and in the fastened position of the rotary cutting tool (20):
the head rear abutment surface (38) abuts the holder base abutment surface (82).

10. The rotary cutting tool (20), according to claim 1, wherein in the fastened position of the rotary cutting tool (20):
in a cross-sectional view taken in a first tool plane (P1) perpendicular to the head central axis (A) and through the fastening surface (72*a*), the holder through bore (B) forms an acute first angle ($\gamma$) with the fastening surface (72*a*), the acute first angle ($\gamma$) being measured in a direction opposite the rotational direction (R); and
in a cross-sectional view taken in a second tool plane (P2) containing the head central axis (A) and the holder through bore axis (B), the holder through bore (B) forms an acute external second angle ($\delta$) with the fastening surface (72*a*).

11. The rotary cutting tool (20), according to claim 1, wherein, the cutting head (22) is angularly displaced, relative to the tool holder (24), by no more than 90° upon adjustment between the guided position and the fastened position of the rotary cutting tool (20).

12. The rotary cutting tool (20), according to claim 1, wherein
the rotary cutting tool (20) is further adjustable between the fastened position and a locked position, and in the locked position:
the cutting head (22) is releasably attached to the tool holder (24) by the elastic fastening assembly (126);
the head coupling pin (60) is located in the holder coupling hole (96);
each cutting arm (42) is in contact with a respective driving member (84); and
the elastic fastening assembly (126) clampingly engages the fastening surface (72*a*).

13. The rotary cutting tool (20), according to claim 12, wherein
the elastic fastening assembly (126) extends along an elastic fastening assembly axis (C) that is co-axial with the holder through bore axis (B);
the elastic fastening assembly (126) comprises a fixation member (206), a rigid member (108) and an elastic biasing member (110) located axially therebetween along the elastic fastening assembly axis (C);
the protruding portion (122) is located on the rigid member (108);
the fixation member (206) is releasably engaged at the holder through bore (102);
the elastic biasing member (110) is a biasing spring (112);
the fixation member (206) further comprises a locking portion (124) extending towards the rigid member (108) through the biasing spring (112);
the fixation member (206) is displaceable along the through bore axis (B), and in the locked position of the rotary cutting tool (20):
the locking portion (124) abuts the rigid member (108).

14. The rotary cutting tool (20), according to claim 1, wherein
the head coupling pin (60) comprises exactly one guiding recess (66) and exactly one fastening recess (70); and
the tool holder (24) comprises exactly one holder through bore (102) and exactly one elastic fastening assembly (26, 126) releasably engaged to the tool holder (24).

15. The rotary cutting tool (20), according to claim 1, wherein
the elastic fastening assembly (26, 126) extends along an elastic fastening assembly axis (C) that is co-axial with the holder through bore axis (B);
the elastic fastening assembly (26, 126) comprises a fixation member (106, 206), a rigid member (108) and an elastic biasing member (110) located axially therebetween along the elastic fastening assembly axis (C);
the protruding portion (122) is located on the rigid member (108); and
the fixation member (106, 206) is releasably engaged at the holder through bore (102).

16. The rotary cutting tool (20), according to claim 15, wherein
the rigid member (108) comprises an end surface (114) that is perpendicular to the elastic fastening assembly axis (C) and a side surface (116) that extends circumferentially along the elastic fastening assembly axis (C) and circumferentially bounds the end surface (114); and
the end surface (114) and the side surface (116) intersect to form a beveled surface (117); and in the fastened position;
a portion of the beveled surface (117) abuts the fastening surface (72a).

17. The rotary cutting tool (20), according to claim 1, wherein the holder through bore axis (B) lies in a holder plane (P) perpendicular to the holder longitudinal axis (D).

18. The rotary cutting tool (20), according to claim 1, wherein the holder through bore axis (B) intersects the holder longitudinal axis (D).

19. The rotary cutting tool (20), according to claim 1, wherein
each cutting arm (42) comprises arm rotationally leading and trailing surfaces (44, 46) and an arm peripheral surface (48) extending peripherally therebetween;
each arm rotationally trailing surface (46) comprises an arm latch (52) that protrudes therefrom and extends in a direction from the head central axis (A) to the arm peripheral surface (48);
each driving member (84) comprises driving member rotationally leading and trailing surfaces (86, 88) and a driving member peripheral surface (90) extending peripherally therebetween;
each driving member rotationally leading surface (86) comprises a driving member undercut (94) that is recessed therefrom and extends in a direction from the holder longitudinal axis (D) to the driving member peripheral surface (90); and
each arm latch (52) is located in a respective driving member undercut (94).

20. The rotary cutting tool (20), according to claim 1, wherein, in the fastened position, the elastic fastening assembly (26, 126) elastically engages the fastening surface (72a) at a contact region that is rotationally behind the holder through bore axis (B).

21. The rotary cutting tool (20), according to claim 1, wherein, in the head coupling pin (60) is non-fluted.

22. The rotary cutting tool (20), according to claim 1, wherein:
the elastic fastening assembly (26, 126) is adjustable between a fastened position in which the elastic fastening assembly (26, 126) has a first length (L1), and a locked position in which the elastic fastening assembly (26, 126) has a second length (L2), the first length (L1) being longer than the second length (L2); and
the protruding portion (122) continues to protrude into the holder coupling hole (96), as the elastic fastening assembly (26, 126) is adjusted between the fastened position and the locked position.

23. The rotary cutting tool (20), according to claim 22, wherein:
the elastic fastening assembly (26, 126) extends along an elastic fastening assembly axis (C) that is co-axial with the holder through bore axis (B); and
the elastic fastening assembly (26, 126) comprises a fixation member (106, 206), a rigid member (108, 208) and an elastic biasing member (110, 210) located axially therebetween along the elastic fastening assembly axis (C).

24. The rotary cutting tool (20), according to claim 23, wherein:
the fixation member (206) is axially spaced apart from the rigid member (208), along the elastic fastening assembly axis (C), by the elastic biasing member (210), when the elastic fastening assembly is in the fastened position and has the first length; and
the fixation member (206) abuts the rigid member (208), when the elastic fastening assembly in the locked position and has the second length.

* * * * *